US010895579B2

(12) United States Patent
Nakano (10) Patent No.: US 10,895,579 B2
(45) Date of Patent: Jan. 19, 2021

(54) AUTOMATIC ANALYZER (71) Applicant: HITACHI HIGH-TECHNOLOGIES CORPORATION, Tokyo (JP)

(72) Inventor: Toshirou Nakano, Tokyo (JP)

(73) Assignee: HITACHI HIGH-TECH CORPORATION, Tokyo (JP)

(*) Notice: Subject to any disclaimer, the term of this patent is extended or adjusted under 35 U.S.C. 154(b) by 223 days.

(21) Appl. No.: 15/553,179

(22) PCT Filed: Feb. 5, 2016

(86) PCT No.: PCT/JP2016/053574
§ 371 (c)(1),
(2) Date: Aug. 24, 2017

(87) PCT Pub. No.: WO2016/140017
PCT Pub. Date: Sep. 9, 2016

(65) Prior Publication Data
US 2018/0113142 A1   Apr. 26, 2018

(30) Foreign Application Priority Data

Mar. 2, 2015 (JP) .................................. 2015-040429

(51) Int. Cl.
G01D 9/00 (2006.01)
G01N 35/00 (2006.01)
(52) U.S. Cl.
CPC ....... G01N 35/00584 (2013.01); G01D 9/005 (2013.01); G01N 35/00 (2013.01);
(Continued)
(58) Field of Classification Search
CPC ......... G01N 2035/00891; G01N 35/00; G01N 35/00584; G01N 35/00613; G01N 35/00693; G01D 9/005
(Continued)

(56) References Cited

U.S. PATENT DOCUMENTS 6,098,029 A * 8/2000 Takagi ...................... G06T 7/60
382/100
7,634,378 B2 * 12/2009 Kaplit ................ G01N 35/1016
340/605
(Continued)

FOREIGN PATENT DOCUMENTS

EP    2 237 044 A2   10/2010
JP    2009-168729    7/2009
(Continued)

OTHER PUBLICATIONS

International Search Report for PCT/JP2016/053574 dated Apr. 26, 2016.
(Continued)

Primary Examiner — John E Breene
Assistant Examiner — Jeffrey P Aiello
(74) Attorney, Agent, or Firm — Mattingly & Malur, PC (57) ABSTRACT Included are an analysis unit that performs an analysis process for analyzing a specimen, a storage unit that stores a result of the analysis process, cumulative information on an occurrence of an event such as registration, change or deletion of analysis parameters such as analysis conditions in the analysis process, and cumulative information on an occurrence of an event such as registration, deletion or replacement of reagent information on a reagent used for analysis of the specimen, for each analysis item, and a display unit that displays the analysis result of the specimen and information on an occurrence status of the event. An operation of the analysis process of the specimen by the analysis unit is controlled, and the information on the event of the analysis parameter and the information on the event of the reagent information is read from the storage unit and displayed in chronological order.

13 Claims, 8 Drawing Sheets (52) U.S. Cl.
CPC . *G01N 35/00613* (2013.01); *G01N 35/00693* (2013.01); *G01N 2035/00891* (2013.01)

(58) Field of Classification Search
USPC .... 422/64, 67, 68.1; 435/7.92, 287.1, 287.2, 435/287.3; 436/43; 506/12; 702/1, 19, 702/22, 100, 104, 179
See application file for complete search history.

(56) References Cited

U.S. PATENT DOCUMENTS

| | | | | |
|---|---|---|---|---|
| 8,343,423 | B2* | 1/2013 | Mori | G01N 35/00663 422/509 |
| 9,529,007 | B2* | 12/2016 | Mizumoto | G01N 35/00623 |
| 2007/0072299 | A1* | 3/2007 | Orihashi | G01N 35/00 436/43 |
| 2007/0107491 | A1* | 5/2007 | Petersen | D21G 9/0027 73/1.16 |
| 2007/0136296 | A1* | 6/2007 | Molesky | G06Q 10/109 |
| 2008/0050280 | A1* | 2/2008 | Fujita | G01N 35/00584 422/67 |
| 2008/0159708 | A1* | 7/2008 | Kazama | H04N 5/91 386/333 |
| 2008/0240988 | A1* | 10/2008 | Wakamiya | G01N 35/00693 422/68.1 |
| 2009/0202390 | A1* | 8/2009 | Iizumi | G16H 10/40 422/67 |
| 2010/0202709 | A1* | 8/2010 | Heavens | G06T 7/35 382/248 |
| 2010/0250200 | A1* | 9/2010 | Mori | G06F 30/15 703/1 |
| 2010/0322822 | A1* | 12/2010 | Fritchie | G01N 35/1009 422/63 |
| 2011/0231000 | A1* | 9/2011 | Higashi | H05K 13/0885 700/105 |
| 2011/0257908 | A1* | 10/2011 | Okabayashi | G01N 35/025 702/50 |
| 2012/0000268 | A1* | 1/2012 | Li | G01N 35/00613 73/1.01 |
| 2012/0205299 | A1* | 8/2012 | Darwinkel | C02F 9/005 210/97 |
| 2012/0253693 | A1* | 10/2012 | Inomata | G01N 35/00663 702/31 |
| 2013/0011298 | A1* | 1/2013 | Itou | G01N 35/00623 422/73 |
| 2013/0151189 | A1* | 6/2013 | Li | G01N 35/00712 702/104 |
| 2014/0136123 | A1* | 5/2014 | Manri | G01N 35/00584 702/30 |
| 2016/0341752 | A1* | 11/2016 | Holmes | G01N 35/0092 |
| 2017/0176479 | A1* | 6/2017 | Ludicke | G01N 35/00722 |
| 2017/0300966 | A1* | 10/2017 | Dereszynski | G06Q 30/0254 |

FOREIGN PATENT DOCUMENTS

| | | |
|---|---|---|
| JP | 2012-208099 A | 10/2012 |
| WO | 2010/073479 | 7/2010 |

OTHER PUBLICATIONS

Extended European Search Report received in corresponding European Application No. 16758712.0 dated Sep. 13, 2018.
International Preliminary Report on Patentability received in corresponding International Application No. PCT/JP2016/053574 dated Sep. 8, 2017.
Japanese Office Action received in corresponding Japanese Application No. 2017-503386 dated Dec. 17, 2019.

* cited by examiner

AUTOMATIC ANALYZER

TECHNICAL FIELD

The present invention relates to an automatic analyzer for performing qualitative and quantitative analysis of biological samples such as serum and urine.

BACKGROUND ART

In an automatic analyzer that performs qualitative and quantitative analysis of a biological sample such as serum and urine (hereinafter, referred to as a specimen), a dedicated reagent is registered and used for each analysis item, physical properties (absorbance, scattered light intensity, or the like) of a reagent (a standard solution reagent or a calibrator) having a known concentration with respect to the analysis item are measured in advance using the reagent which is registered previously, calibration curve data representing the relationship between each concentration and a measured value (absorbance, scattered light intensity, or the like) is generated, and the concentration of the specimen is calculated based on the calibration curve data, analysis parameters such as preset analysis conditions, and the like.

In such an automatic analyzer, in a case where some defect such as data abnormality occurs in the analysis result of the specimen, in order to recognize how the relevant analysis item is measured, it is necessary to check analysis parameters such as preset analysis conditions, the information (reagent information) on the reagent used for analysis, and the like to investigate the cause, and solve the problem promptly.

For example, PTL 1 (JP-A-2009-168729) discloses, as a technique for supporting survey and analysis in a case where some defect such as data abnormality occurs in a specimen measurement result in an automatic analyzer, an automatic analyzer including an analytical system that measures components of a specimen using analytical elements, a storage unit that stores a measurement result including measurement result elements measured by the analytical system, and an output unit that outputs the measurement result stored in the storage unit, in which a data processing unit that performs data processes on the measurement result stored in the storage unit, according to a combination of the analytical elements which are arbitrarily selected is provided in the automatic analyzer, and the output unit is capable of outputting the processing result obtained from the data processing by the data processing unit.

CITATION LIST

Patent Literature

PTL 1: JP-A-2009-168729

SUMMARY OF INVENTION

Technical Problem

However, in the above-described related art, various types of information necessary for investigating the cause of defect in the analysis process, in particular, information pieces which are individually scattered without cooperation are displayed separately. Therefore, in searching and collecting works of various types of information required for investigation in the case where some defect such as data abnormality occurs in the specimen measurement result, and checking and information analysis works using various types of information, since there is a possibility that it is complicated and inaccurate, and misinterpretation of each data, and the like, expertise in each screen of the automatic analyzer is needed, in addition to much time and effort, and maintenance and operability of the automatic analyzer is decreased, so there is also a possibility that work may be hindered in clinical examination and the like.

The present invention has been made in view of the above problems, and an object of the present invention is to provide an automatic analyzer capable of shortening the time required for investigating and analyzing defects and improving reliability, by improving the searchability and visibility of various types of information relating to investigation of defect in the case where some defect such as abnormality in data of a specimen measurement result occurs.

Solution to Problem

In order to achieve the above object, the present invention includes an analysis unit that performs an analysis process for analyzing a specimen to be analyzed, a storage unit that stores a result of the analysis process, cumulative information on an occurrence of events such as registration, change and deletion of analysis parameters such as analysis conditions in the analysis process, and cumulative information on an occurrence of events such as registration, deletion and replacement of reagent information which is information on a reagent used for analysis of the specimen, for each analysis item of the specimen, a display unit that displays the analysis result of the specimen and information on an occurrence status of the events, and a control unit that controls an operation of the analysis process of the specimen by the analysis unit, and reads the information on the events of the analysis parameter and the information on the events of the reagent information from the storage unit and displays the read information on the display unit in chronological order, the control unit places the information on the event of the analysis parameter, and the information on the event of the reagent information, on a plane in which an axis relating to an occurrence time of the event and an axis relating to an occurrence order of the event are set to be orthogonal to each other, on the display unit.

Advantageous Effects of Invention

It is possible to shorten the time required for investigating and analyzing defects and improve reliability, by improving the searchability and visibility of various types of information relating to investigation of defect in the case where some defect such as data abnormality occurs in a specimen measurement result.

DESCRIPTION OF EMBODIMENTS

An embodiment of the present invention will be described with reference to the drawings.

Figure 1:
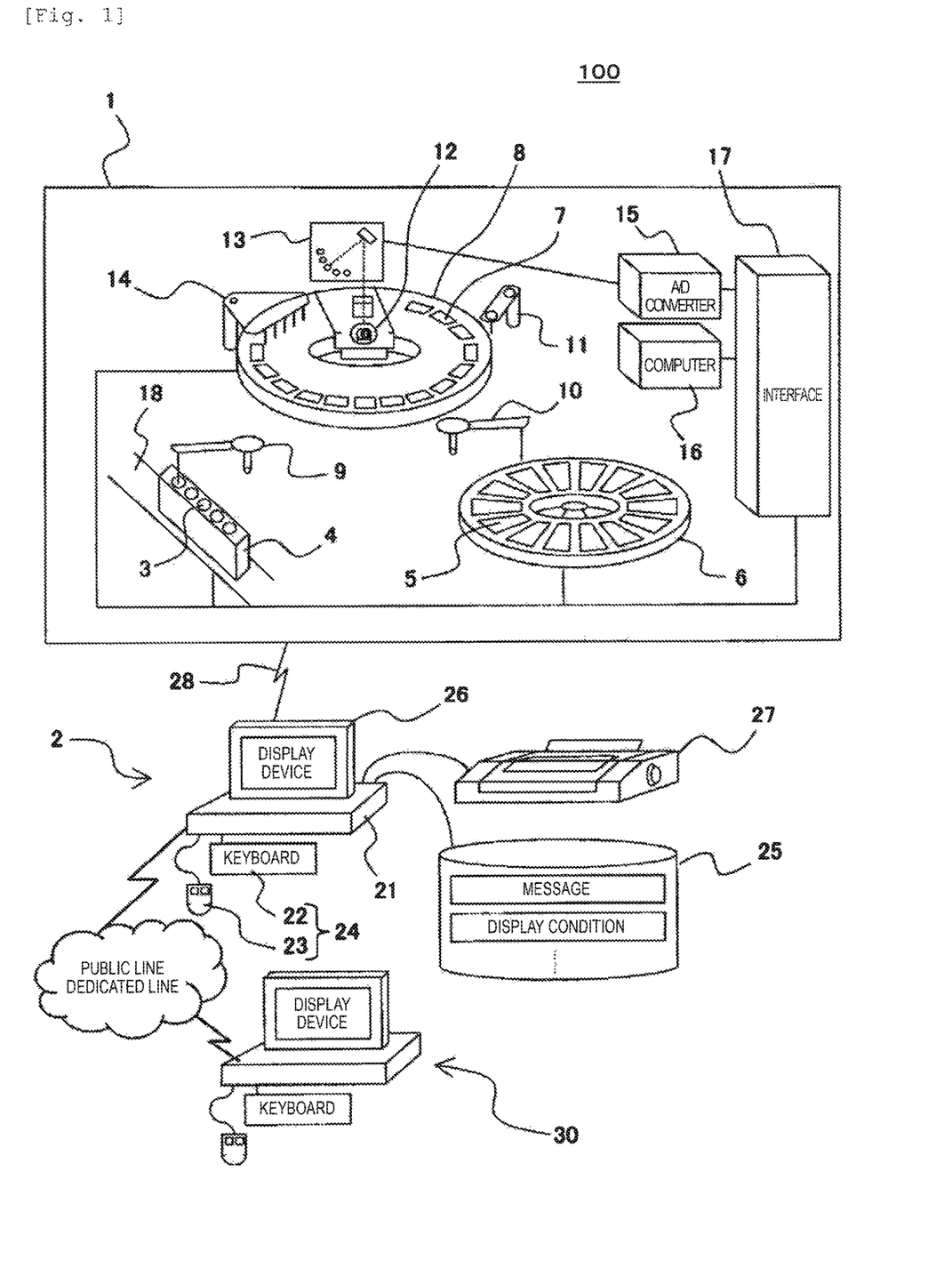
FIG. 1 is a diagram schematically showing an overall configuration of an automatic analyzer according to a present embodiment.

FIG. 1 is a diagram schematically showing the overall configuration of an automatic analyzer according to the present embodiment.

In FIG. 1, an automatic analyzer 100 includes at least one analysis unit 1 and an operation unit 2. The analysis unit 1 adds a reagent or the like to a specimen to be analyzed (for example, a biological sample such as blood or urine), and measures its physical properties (absorbance, scattering high intensity, or the like). The analysis unit 1 includes a rack 4 that accommodates a specimen container 3 containing the specimen to be analyzed and being transported by a rack transport belt 18, a reagent disc 6 that accommodates a plurality of reagent bottles 5 containing reagents to be added to the specimen to be analyzed, a reaction disc 8 that accommodates a plurality of reaction containers 7 containing a reaction solution obtained by adding a reagent to a specimen to be analyzed, a specimen dispensing probe 9 for dispensing the specimen contained in the specimen container 3 into a predetermined reaction container 7, a reagent dispensing probe 10 for dispensing the reagent contained in the reagent bottle 5 into a predetermined reaction container 7, a stirring device 11 that stirs the reaction solution contained in the reaction container 7, a light source 12 that irradiates the reaction solution contained in the reaction container 7 with a luminous flux, a multi-wavelength photometer 13 that detects light irradiated from the light source 12 and transmitted through the reaction container 7, an A/D converter 15 that converts a detection signal in the multi-wavelength photometer 13, a cleaning device 14 that cleans the reaction container 7, and a computer 16 that controls the operation of each component of the analysis unit 1. Each component of the analysis unit 1 is connected to the computer 16 through an internal interface 17.

The operation unit 2 operates the analysis unit 1, and includes a control device 21 that controls the overall operation of the automatic analyzer including the operation unit 2, an input device 24 such as a keyboard 22 or a mouse 23 for inputting various commands and information, a storage device 25 such as a hard disk that stores various data such as measurement request information and analysis parameters, a display device 26 that displays an operation screen or the like, and a printing device 27. The operation unit 2 is connected to the analysis unit 1 through an external interface 28. The operation unit 2 is connected to an external information processing apparatus 30 through a network 29 such as a public line or a dedicated line, and can exchange parameters and data.

In the automatic analyzer of the present embodiment, the operator inputs various commands such as measurement instructions by the input device 24 of the operation unit 2, thereby performing the operations of an analysis process. When the start of the analysis process is instructed, the specimen dispensing probe 9 dispenses a predetermined amount of the specimen contained in the specimen container 3 into each reaction container 7 according to the number of items requested. When the dispensing process for a specimen in a certain specimen container 3 is completed, the rack transport belt 18 moves the rack 4 such that the next specimen container 3 comes to the specimen dispensing position (immediately below the specimen dispensing probe 9). The reaction container 7 into which the specimen is dispensed is moved by the rotation operation of the reaction disc 8. Dispensing of the reagent in the reagent bottle 5 by the reagent dispensing probe 10, stirring of the reaction solution by the stirring device 11, and measurement of absorbance by the light source 12 and the multi-wavelength photometer 13 are performed sequentially on the reaction container 7 on the reaction disc 8, and thereafter, the reaction container 7 whose measurement has been completed is cleaned by the cleaning device 14. The absorbance signal (detection signal) detected by the multi-wavelength photometer 13 is converted by the A/D converter 15 and input to the computer 16 through the internal interface 17. From the absorbance signal input to the computer 16, analysis is performed by a program based on an analysis method previously set for each measurement item. For example, in a case of measuring a standard solution sample (calibrator), calibration curve data is calculated from the set known concentration value. Further, in a case of measuring a specimen (biological sample) such as a patient specimen and a quality control sample, concentration data is calculated using calibration curve data obtained by measuring a standard solution sample. These data items are added with information obtained by symbolizing the type or the like of the sample as a measurement result, are transmitted to the operation unit 2 through the external interface 28, stored in the storage device 25, and printed by the printing device 27 as necessary. Further, the operation unit 2 and the external information processing apparatus 30 exchange data as necessary.

The storage device 25 stores, in addition to the result of the analysis process, cumulative information on the occurrence of events such as registration, change, or deletion of analysis parameters in the analysis process, cumulative information on the occurrence of events such as registration, deletion, or replacement of reagent information which is information on a reagent used for analysis of a specimen, cumulative information on the occurrence of events such as generation, editing, succession, or deletion of calibration results of reagents used in the analysis process of a specimen, and cumulative information on an occurrence of events such as generation of quality control information on the reagent used in the analysis process of the specimen. Each piece of information is stored for each analysis item, and analysis item names, event types (such as analysis parameters, reagent information, calibration results, and quality control information), event contents (such as generation, registration, editing, succession, change, replacement, and deletion), the occurrence time of an event, and detailed contents thereof are stored in association with each other.

The analysis parameters are analysis conditions in the analysis process (the amount of a specimen to be collected, the type and amount of reagent to be subjected to the analysis process, optimal measurement conditions, or the like). The analysis parameters are registered in advance before the start of the analysis process, and are changed and deleted as necessary.

The reagent information is information relating to a reagent used for analyzing a specimen, which is registered previously before the start of the analysis process and is deleted as necessary, and information on replacement of the reagent is added thereto. The reagents used in the analysis process are managed in units of lots, and a plurality of reagents are registered and waited for each analysis item in the inside of the automatic analyzer 100.

The calibration result is generated when the calibration of the reagents used in the analysis process of the specimen is performed, and is edited and deleted as necessary. In addition, when the reagent used in the analysis process is not left, the reagent is automatically replaced with the waiting reagent and the analysis item is continuously analyzed. At that time, for the calibration curve data of the replaced reagent used for the analysis, the optimal one among the calibration curve data generated in the past using the same lot of reagents is succeeded. The calibration result is succeeded by the succession function of the calibration result, and it is not necessary to perform the calibration again with the replaced reagent to generate the calibration curve data.

The quality control information is generated when the quality control process is executed. In the quality control process, the quality control of reagents used in the analysis process of the specimen is performed, and the reliability of the analysis results is ensured, by periodically measuring an quality control sample of a known concentration and checking whether or not the measurement result obtained from the reagent and the calibration curve data thereof is within the effective range of the known concentration.

In the automatic analyzer 100 according to the present embodiment, in the case where some defect such as data abnormality occurs in the analysis result of the specimen, in order to know how the corresponding analysis item is measured, analysis parameters, reagent information, a calibration result, and quality control information are displayed on the display unit. The operator investigates the cause of the defect based on the information displayed on the display unit, and attempts to solve the problem promptly.

Figure 2:
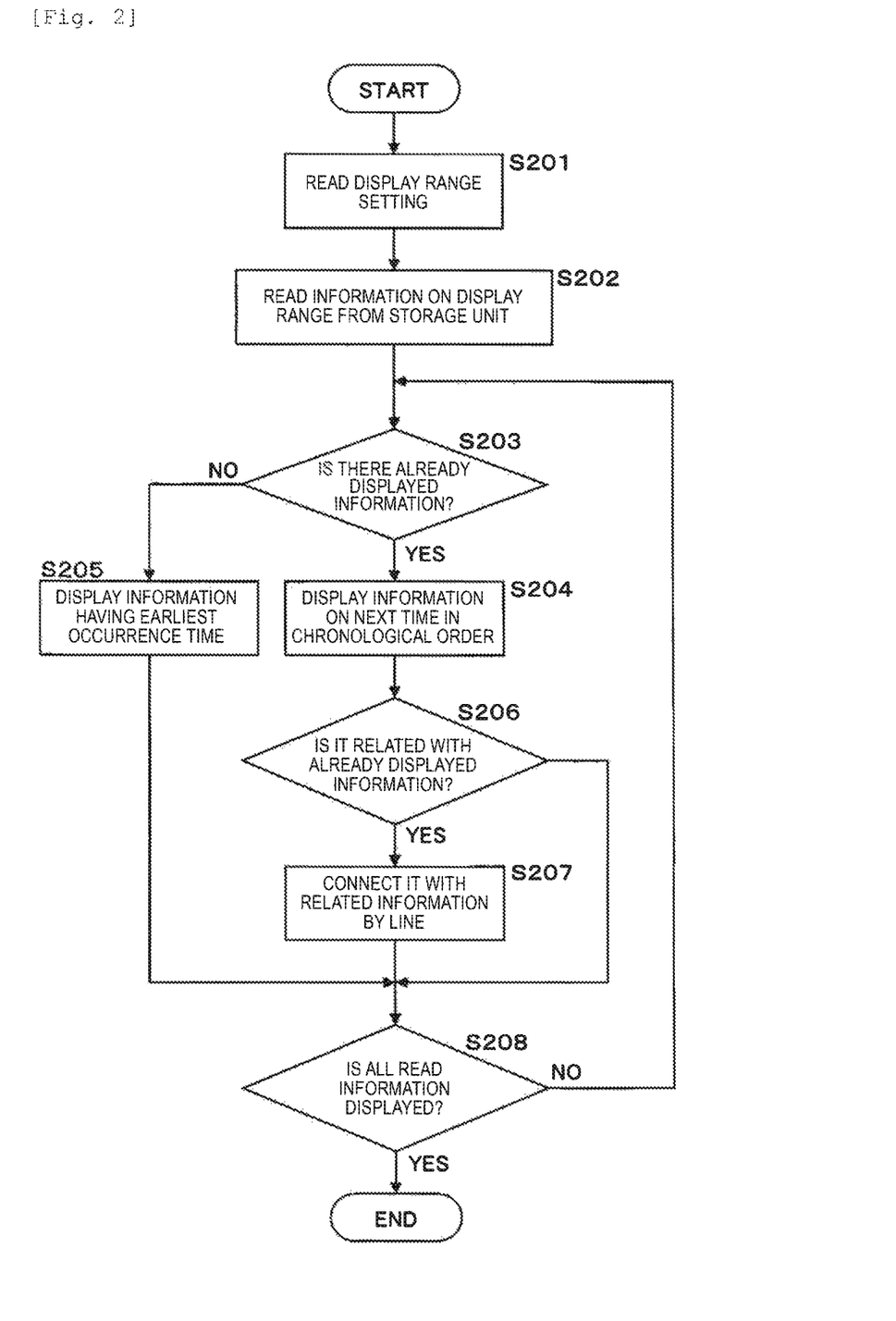
FIG. 2 is a flowchart showing an information display process on an analysis item trace screen displayed on a display unit.

FIG. 2 is a flowchart showing an information display process on an analysis item trace screen displayed on a display unit.

In FIG. 2, the control device 21 reads a display range set on the display range setting screen (described later) (step S201), and reads analysis parameters, reagent information, calibration results, and quality control information from the storage device 25 based on the read display range (step S202). It is determined whether or not there is information which is already displayed (step S203). In a case where the determination result is NO, information having the earliest occurrence time among the read information is displayed (step S205), and the process proceeds to step S208. If the determination result in step S203 is YES, information is displayed in chronological order corresponding to the already displayed information (step S204). Subsequently, it is determined whether or not there is a relation with the already displayed information (step S206). If the determination result is YES, it is connected with the related information by a line (step S207), and the process proceeds to step S208. In a case where the determination result in step S206 is NO, the process proceeds to step S208. In step S208, is determined whether or not all the read information is displayed (step S208). In a case where the determination result is NO, the process returns to step S203. In a case where the determination result is YES, the process is ended.

Figure 3:
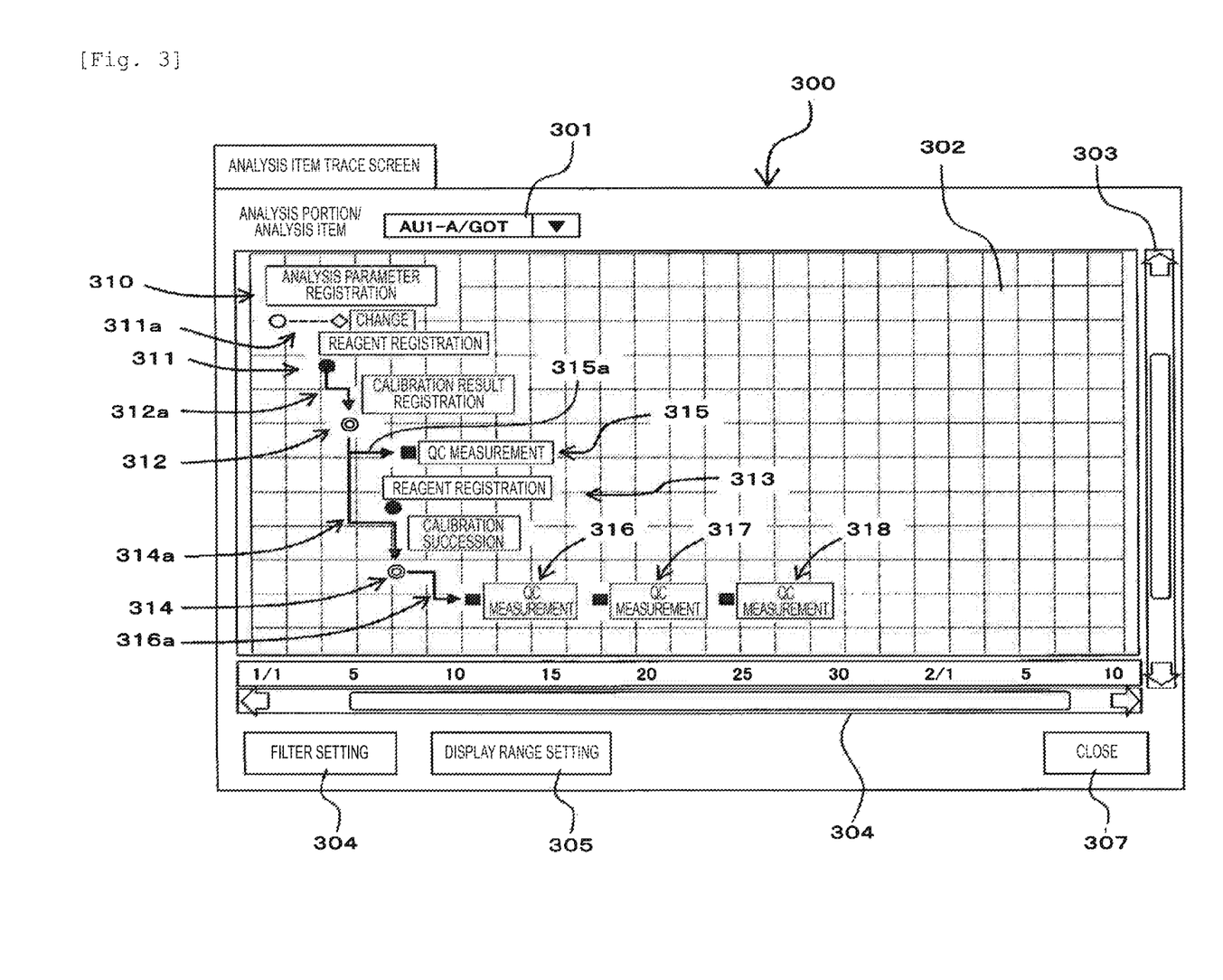
FIG. 3 is a diagram showing an analysis item trace screen displayed on a display device by a control device.

FIG. 3 is a diagram showing an analysis item trace screen displayed on a display device by a control device.

In FIG. 3, the analysis item trace screen 300 displays the occurrence status of events of various items (types of events) related to the measurement result of analysis items in chronological order, and includes a pull-down list 301 for an operator to select an analysis item to be investigated, an information display portion 302 for displaying the occurrence status of each event in chronological order, a vertical scroll bar 303 and a horizontal scroll bar 304 for moving the display range of the information display portion 302, a filter setting button 305 for displaying a screen for performing filter setting of information to be displayed, a display range setting button 306 for setting the display range of the analysis item trace screen 300, and a close button 307 for closing the analysis item trace screen 300.

The information display portion 302 has a configuration in which the generation order of various items is set in the vertical axis direction, the time is set in the horizontal axis direction, and the occurrence date and time of each event are represented on the horizontal axis, and items are displayed in a chronological order.

For example, in the information display portion 302, occurrence status 310 of events (registration, change, or deletion) of analysis parameters is displayed so as to be identified for each event in one row, as basic information on the analysis item selected in the pull-down list 301. The transition of the entire information is checked by operating the horizontal scroll bar 304.

Subsequently, in a case where occurrence statuses 311 and 113 of events (registration, replacement, or deletion) of reagent is displayed, a plurality of reagents can be registered for the analysis parameters, and the events are displayed in separate lines in units of reagents. At this time, except for the case of succeeding the calibration result, it is connected by a line 311a showing the relation with the event of the related analysis parameter. Each event for one reagent is displayed so that it can be identified in one row, and the transition of the entire information is checked by operating the horizontal scroll bar. Further, the process in which some reagents are registered is checked by operating the vertical scroll bar.

Subsequently, the occurrence statuses 312 and 314 of the calibration events (result registration, editing, succession, or deletion) for a displayed reagent are displayed so that each event can be identified in one row. The overall transition of the event with respect to one calibration is checked by operating the horizontal scroll bar 304. At this time, it is connected by a line 312a showing the relation with the related reagent information. In a case where the calibration result is succeeded by the function of succeeding the past calibration result, it is shown that the succeeded calibration result is connected to the past calibration result with the line 314a so as to know which calibration result in the past is succeeded.

In addition, occurrence statuses 315, 316, 317, and 318 of the event (measurement) of quality control (QC) information using one calibration result are displayed on one row. At this time, it is connected by lines 315a and 316a showing the relation with the related calibration result. The transition of the entire information is checked by operating the horizontal scroll bar.

As described above, since it is an operational form of an automatic analyzer that calibration and QC events occur for one reagent, the calibration information and the QC information are positioned as incidental information derived from the reagent information. Therefore, it is displayed as a group of three rows composed of one reagent, calibration, and QC.

It is displayed in three rows for another reagent, and the transition of the whole information is checked by operating the vertical scroll bar.

Although FIG. 3 shows an example of display of each event, each event is displayed or hidden, based on the setting of the display conditions on the filter setting screen 700 (see FIG. 7) to be described later. Therefore, depending on the setting of the filter setting screen 700, in addition to the case of displaying the analysis parameter, the calibration result, the reagent information, and the quality control information as shown in FIG. 3, the analysis parameter, the calibration result, and the reagent information may be displayed, or the analysis parameter, the calibration result, and the quality control information may be displayed in some cases.

Figure 4:
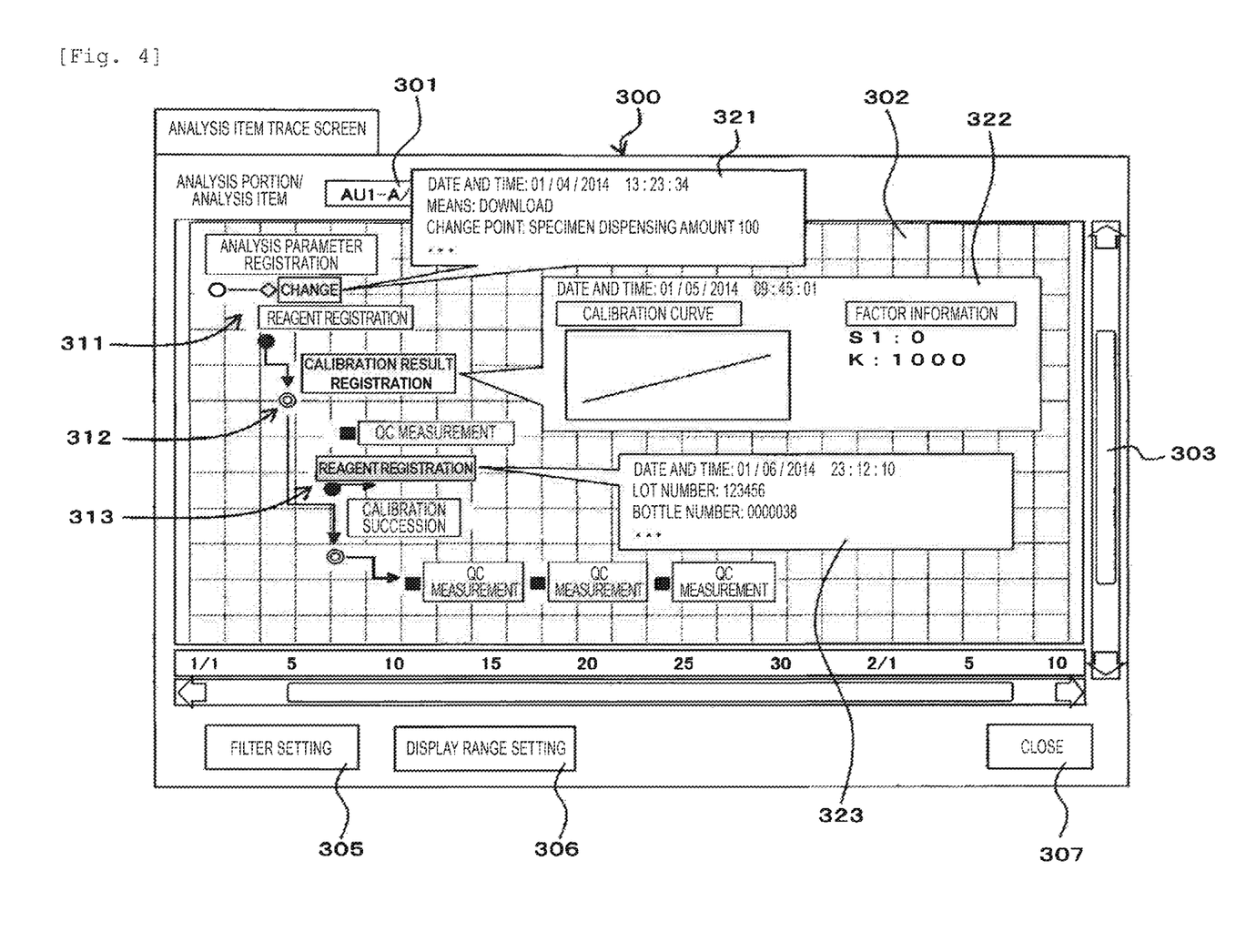
FIG. 4 is a diagram showing an example of displaying details of each event content when each event portion is pointed, on the analysis item trace screen.

FIG. 4 is a diagram showing an example of displaying details of each event content when each event portion is pointed, on the analysis item trace screen.

In FIG. 4, in a case where the event occurrence status 311 related to the analysis parameter change is pointed, detailed information such as date and time, means, and a change point is displayed (is popped up) on the pop-up screen 321, for example. Similarly, in a case where the event occurrence status 312 related to calibration result registration is pointed, detailed information such as date and time, a calibration curve, and a factor is displayed (is popped up) on the pop-up screen 322. Similarly, in a case where the reagent registration event occurrence status 313 is pointed, detailed information such as date and time, a lot number, and a bottle number is displayed (popped up) on the pop-up screen 323. The operator can check a time and an analysis parameter which is changed for a target analysis item, and a reagent and a calibration result which are used for analysis of the specimen, on one screen, without traveling between various screens.

Figure 5:
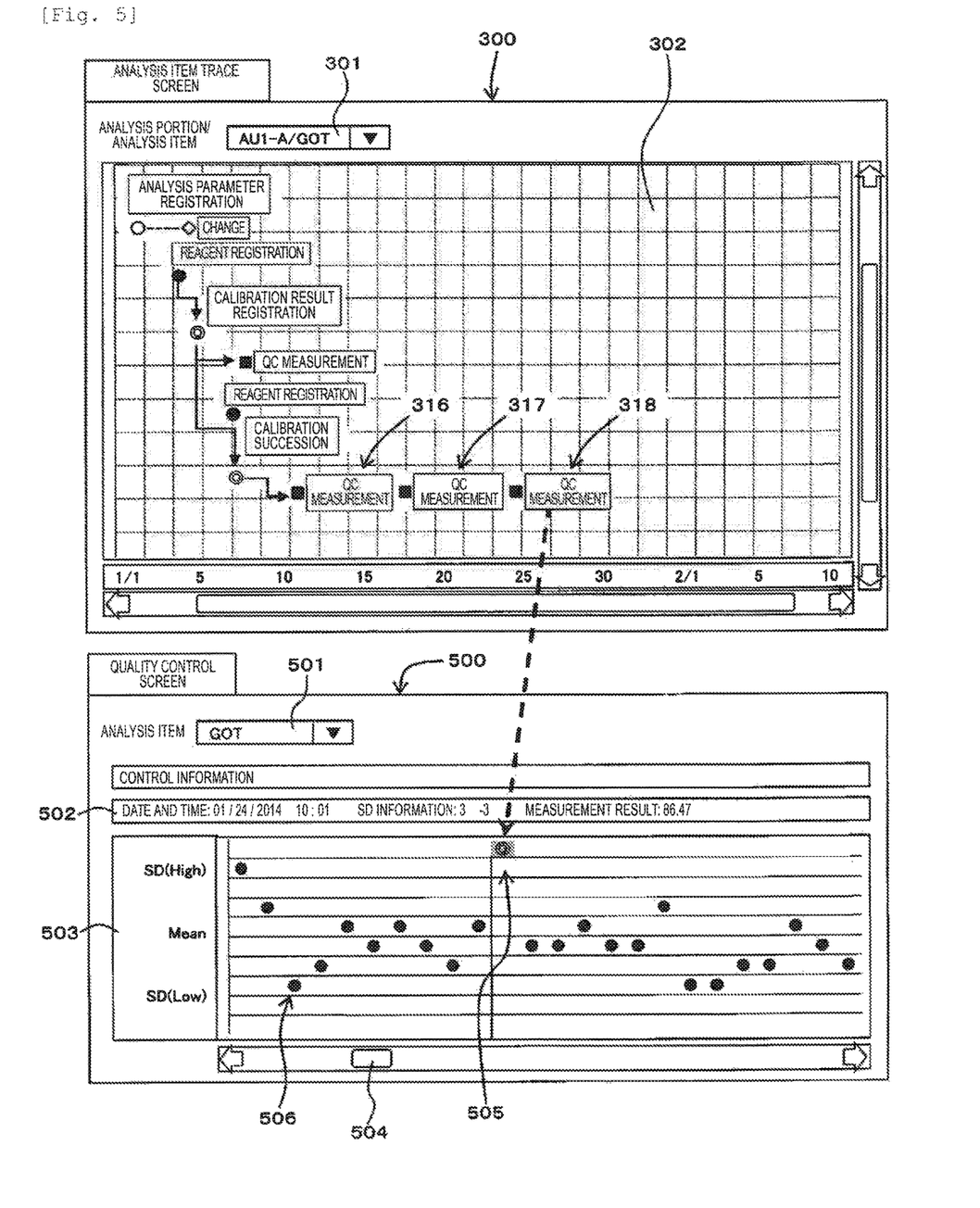
FIG. 5 is a diagram showing cooperation between the analysis item trace screen and a quality control screen.

FIG. 5 is a diagram showing cooperation between the analysis item trace screen and a quality control screen.

In FIG. 5, the quality control screen 500 displays the details of the quality control information, and includes an analysis item setting unit 501, various information display portions 502 for displaying various types of information such as the generation (measurement) date and time of measurement and the measurement result of the quality control information and the measurement result, a result display portion 503 for displaying the cumulative measurement result of the quality control, and a horizontal scroll bar 504.

In a case where an event occurrence status (for example, QC measurement event occurrence status 318) of arbitrary quality control information (QC information) being displayed on the analysis item trace screen 300 is selected, the screen transitions to the quality control screen 500, and a data plot 505 corresponding to the event occurrence status 318 of the quality control information selected from the data plot group (data plot 506 or the like) of the measurement result displayed on the result display portion 503, among the cumulatively managed measurement results is focused by highlighting or the like and displayed. As described above, the event occurrence status of the quality control information on the analysis item trace screen 300 and each measurement result of the quality control information on the quality control screen 500 are cooperated, and the operator can easily search for target data, while it is not necessary to manually search for target data from the data plot group on the quality control screen.

Figure 6:
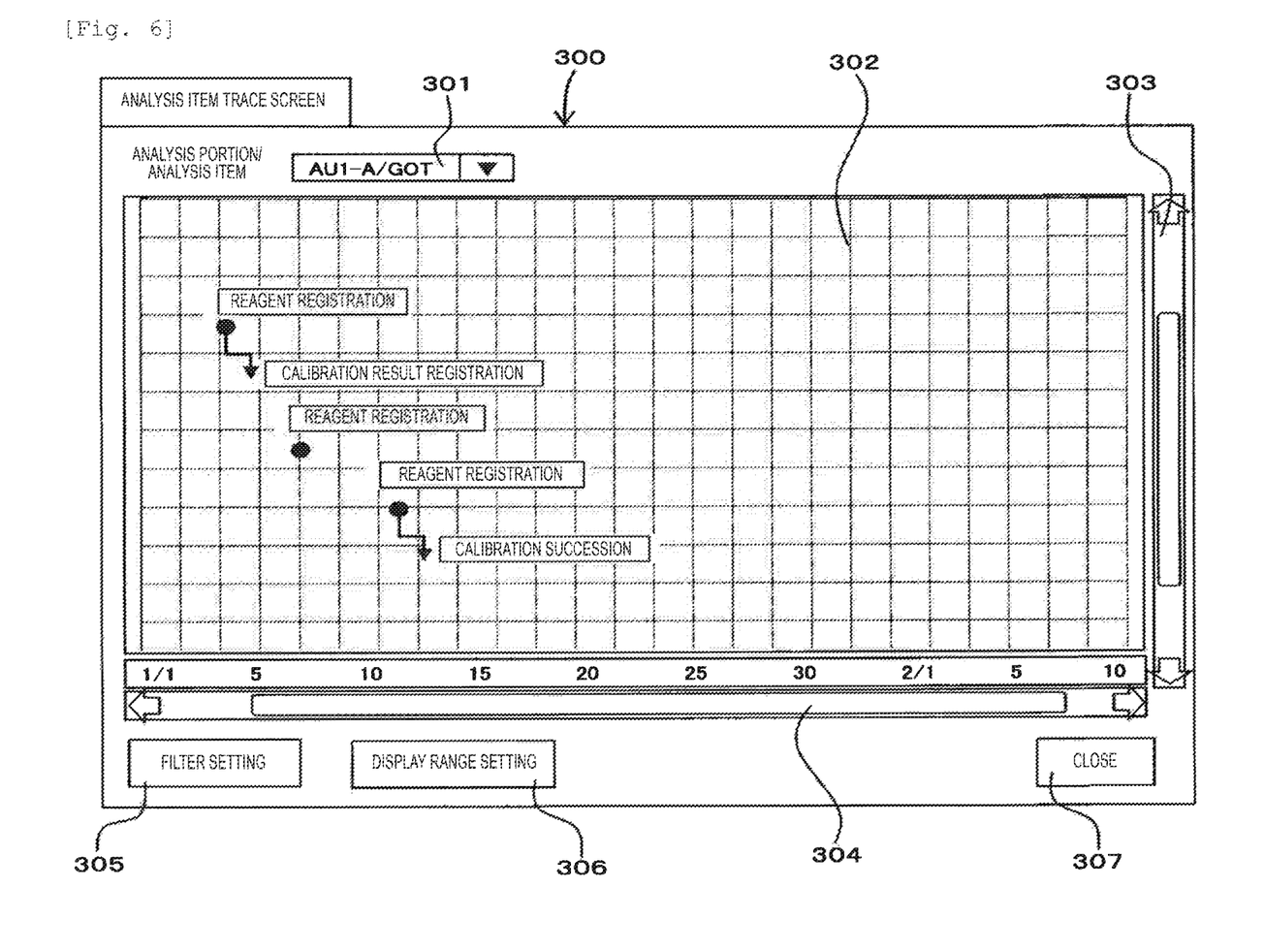
FIG. 6 is a diagram showing an example of a case where information is displayed by filtering the analysis item trace screen.
Figure 7:
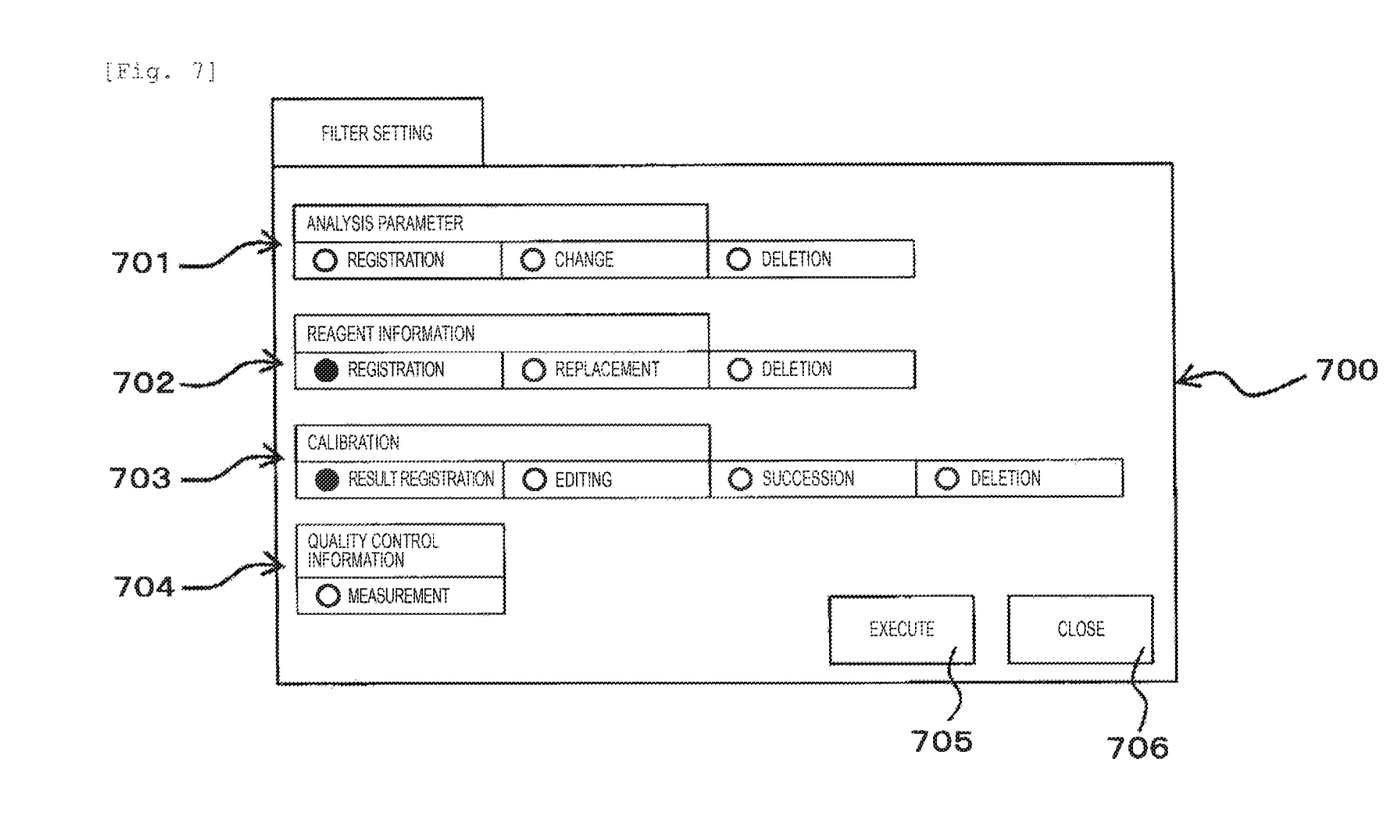
FIG. 7 is a diagram showing an example of a filter setting screen.

FIG. 6 is a diagram showing an example of a case where information is displayed by filtering the analysis item trace screen, and FIG. 7 is a diagram showing an example of a filter setting screen.

In FIG. 6, when the filter setting button 305 is pressed, the filter setting screen 700 of FIG. 7 is displayed.

In FIG. 7, the filter setting screen 700 is a screen for setting filtering conditions of information to be displayed on the information display portion 302 of the analysis item trace screen 300, and includes an analysis parameter filtering condition setting portion 701 for setting a filtering condition related to analysis parameters, a reagent information filtering condition setting portion 702 for setting a filtering condition related to reagent information, a calibration result filtering condition setting portion 703 for setting a filtering condition related to a calibration result, a quality control information filtering condition setting portion 704 for setting a filtering condition related to quality control information, an execution button 705, and a close button 706.

Each of the filtering condition setting portions 701, 702, 703, and 704 is provided with a setting unit of a filtering condition related to the event contents (generation, registration, editing, succession, change, replacement, deletion, or the like). By selecting them appropriately and pressing the execution button 705, the display content of the information on the analysis item trace screen 300 is switched to the display of only the event selected on the filter setting screen 700. The display contents of the information display portion 302 at this time are aggregated with the selected events, and the display interval of each piece of information in the vertical direction of the screen (direction of the vertical axis) is reduced. A plurality of event contents can be selected, and if all the events of each item are selected, only a specific item can be displayed. In the examples of FIGS. 6 and 7, the case where the analysis item trace screen 300 is displayed by selectively executing the registration of the reagent information and the registration of the calibration result is exemplified. That is, in a case where the operator wants to pay attention only to a specific event or a specific item, necessary information can be easily obtained by pressing the filter setting button 305 and setting the filtering condition on the filter setting screen 700.

Figure 8:
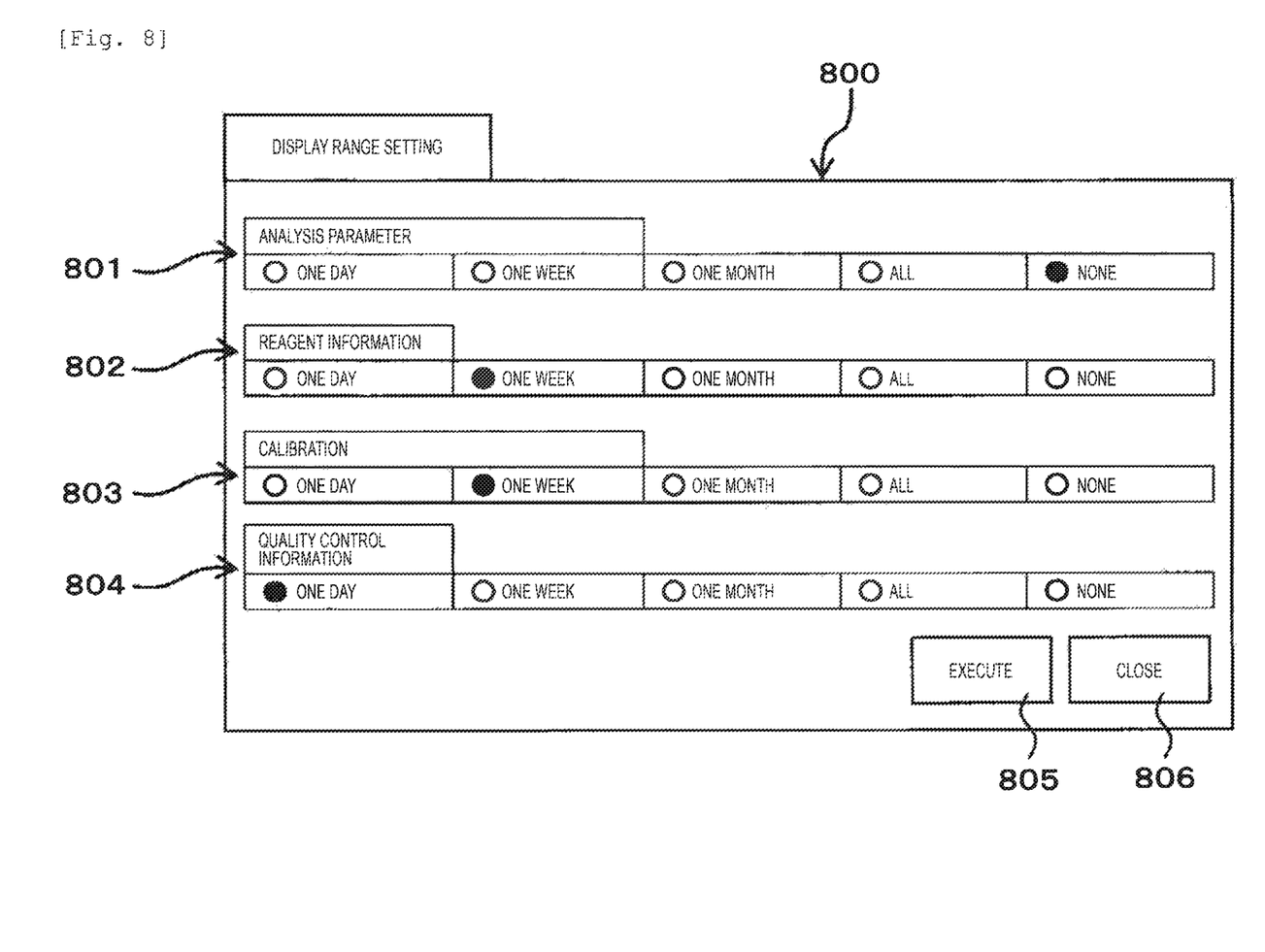
FIG. 8 is a diagram showing an example of a display range setting screen for setting a range of a display period of each item.

FIG. 8 is a diagram showing an example of a display range setting screen for setting a range of a display period of each item.

In FIG. 8, the display range setting screen 800 is displayed by pressing the display range setting button 306 on the analysis item trace screen 300.

The display range setting screen 800 is used by the operator to set the range of the display period of each item, and includes an analysis parameter display range setting portion 801 for setting the range of the display period related to the analysis parameter, a reagent information display range setting portion 802 for setting the range of the display period related to the reagent information, a calibration result display range setting portion 803 for setting the range of the display period related to the calibration result, a quality control information display range setting portion 804 for setting the range of the display period related to the quality control information, an execution button 805, and a close button 806.

Each of the display range setting portions 801, 802, 803, and 804 is provided with a setting portion of the range of the display period. If the setting of one day, one week, one month, all, or none is appropriately selected as the display range and the execution button 805 is pressed, the display period of information on each item of the analysis item trace screen 300 is switched to the display of only the range of the set display period. At this time, since the display periods are aggregated and displayed, the interval between the items in the horizontal direction of the screen is reduced.

By combining the filter function of the filter setting screen 700 and the display range setting function of the display range setting screen 800, the operator can check the event occurrence status of various items related to the analysis items to be investigated, in many ways.

Effects of the present embodiment configured as described above will be described.

In the above-mentioned related art, various types of information necessary for investigating the cause of defect in the analysis process, in particular, information pieces which are individually scattered without cooperation are displayed separately. Therefore, in searching and collecting works of various types of information required for investigation in the case where some defect such as data abnormality occurs in the specimen measurement result, and checking and information analysis works using various types of information, since there is a possibility that it is complicated and inaccurate, and misinterpretation of each data, and the like, expertise in each screen of the automatic analyzer is needed, in addition to much time and effort, and maintenance and operability of the automatic analyzer is decreased, so there is also a possibility that work may be hindered in clinical examination and the like.

In contrast, the present embodiment is configured to include an analysis unit that performs an analysis process for analyzing a specimen to be analyzed, a storage unit that stores a result of the analysis process, cumulative information on an occurrence of an event such as registration, change or deletion of analysis parameters such as analysis conditions in the analysis process, and cumulative information on an occurrence of an event such as registration, deletion or replacement of reagent information which is information on a reagent used for analysis of the specimen, for each analysis item of the specimen, a display unit that displays the analysis result of the specimen and information on an occurrence status of the event, and a control unit, and an operation of the analysis process of the specimen by the analysis unit is controlled, and the information on the event of the analysis parameter and the information on the event of the reagent information is read from the storage unit and displayed on the display unit in chronological order, such that it is possible to improve the searchability and visibility of various types of information relating to investigation of defect in the case where some defect such as data abnormality occurs in a specimen measurement result, which makes it possible to shorten the time required for investigating and analyzing defects and improve reliability.

It should be noted that the present invention is not limited to each of the above-described embodiments, and various modifications are included. For example, the above-described embodiments have been described in detail in order to explain the present invention in an easy-to-understand manner and are not necessarily limited to those having all the configurations described.

REFERENCE SIGNS LIST

1 Analysis Unit
2 Operation Unit
21 Control Device
25 Storage Device
26 Display Device
100 Automatic Analyzer
300 Analysis Item Trace Screen
302 Information Display Portion
305 Filter Setting Button
306 Display Range Setting Button
500 Quality Control Screen
700 Filter Setting Screen
800 Display Range Setting Screen

The invention claimed is:

1. An automatic analyzer comprising:
an analysis unit that performs an analysis process for analyzing a specimen to be analyzed;
a storage unit that stores a result of the analysis process, cumulative information of occurrences of events of analysis parameters in the analysis process, each event of analysis parameters including one of registration, change or deletion of analysis parameters in the analysis process, and cumulative information of occurrences of events of reagent information, which is information on a reagent used for analysis of the specimen, each event of reagent information including one of registration, deletion or replacement of reagent information, for each analysis item of the specimen;
a display unit that displays the analysis result of the specimen and information of occurrence statuses of events of analysis parameters in the analysis process and information of occurrence statuses of events of reagent information; and
a control unit, configured to:
control an operation of the analysis process of the specimen by the analysis unit,
read the information of the events of the analysis parameters and the information of the events of the reagent information from the storage unit and display the read information on the display unit in chronological order, and
simultaneously display, on the display unit:
the information of the events of the analysis parameters and the information of the events of the reagent information, on a plane in which an axis relating to an occurrence time of the events and an axis relating to an occurrence order of the events indicating an order of occurrence of the events are set to be orthogonal to each other, wherein the information of the events of the analysis parameters and the information of the events of the reagent information are displayed according to the occurrence time of the events along the axis relating to the occurrence time of the events and displayed according to the occurrence order of the events along the axis relating to the order of occurrence of the events, and
graphical information of a line connecting related events, which indicates a connection of the related events,
wherein the related events are among the events simultaneously displayed on the plane.

2. The automatic analyzer according to claim 1,
wherein the storage unit further stores cumulative information on an occurrence of an event such as generation, editing, succession, or deletion of a calibration result of the reagent used in the analysis process of the specimen, and
wherein the control unit displays information on the event of the calibration result in chronological order on the display unit, together with the information on the event of the analysis parameter and the information on the event of the reagent information.

3. The automatic analyzer according to claim 2,
wherein the storage unit further stores cumulative information on an occurrence of an event including generation of quality control information of the reagent used in the analysis process of the specimen, and
wherein the control unit displays the information on the event of the quality control information in chronological order on the display unit, together with the information on the event of the analysis parameter, the information on the event of the reagent information, and the information on the event of the calibration result.

4. The automatic analyzer according to claim 1,
wherein the storage unit further stores cumulative information on an occurrence of an event such as generation of quality control information of the reagent used in the analysis process of the specimen, and
wherein the control unit displays the information on the event of the quality control information in chronological order on the display unit, together with the information on the event of the analysis parameter and the information on the event of the reagent information.

5. The automatic analyzer according to claim 1,
wherein in a case where each event such as registration, change, or deletion of the analysis parameter displayed on the display unit, or generation, editing, succession, or deletion of the calibration result of the reagent used in the analysis process of the specimen is selected by a cursor for performing an operation on the display unit, detailed information on the contents of each event is displayed on the display unit.

6. The automatic analyzer according to claim 1,
wherein in a case where each event such as registration, change, or deletion of the analysis parameter displayed on the display unit, or generation, editing, succession, or deletion of a calibration result is selected by a cursor for performing an operation on the display unit, detailed information on the contents of each event is popped up on the display unit.

7. The automatic analyzer according to claim 1,
wherein the control unit can filter information to be displayed on the display unit, with the type of information such as the analysis parameter, the reagent information, the calibration result of the reagent used in the analysis process of the specimen, and quality control information of the reagent used in the analysis process of the specimen, or with an event such as registration, change, deletion, or replacement.

8. The automatic analyzer according to claim 1,
wherein the display unit includes a setting portion for setting a display period range of the event of the analysis parameter, the reagent information, the calibration result of the reagent used in the analysis process of the specimen, and quality control information on the reagent used in the analysis process of the specimen.

9. An automatic analyzer comprising:
an analysis unit that performs an analysis process for analyzing a specimen to be analyzed;
a storage unit that stores information of occurrences of events of registration of reagent information which is information on a reagent used for analysis of the specimen, registration of a calibration result for the reagent, and measurement of quality control information using the calibration result, for each analysis item;
a display unit that displays the information of the occurrences of the events; and
a control unit, configured to:
control an operation of the analysis process of the specimen by the analysis unit,
read the information of the occurrences of the events from the storage unit and display the read information on the display unit in chronological order, and
simultaneously display, on the display unit:
the information of the occurrence of the events, on a plane in which an axis relating to an occurrence time of the events and an axis relating to an occurrence order of the events indicating an order of occurrence of the events are set to be orthogonal to each other, on the display unit, wherein the information of the occurrences of the events of registration of the reagent information, and information of the occurrences of the events of registration of the calibration result or the events of measurement of the quality control information, are displayed on the plane, according to the occurrence order of the events along the axis relating to the occurrence order of the events and according to the occurrence time of the events along the axis relating to the occurrence time of the events,
and
graphical information of a line connecting related events, which indicates a connection of the related events,
wherein the related events are among the events simultaneously displayed on the plane.

10. The automatic analyzer according to claim 9,
wherein the control unit places the information of the occurrence of the events of registration of the reagent information, and the information of the occurrence of the events of measurement of the quality control information, on the plane, along the axis relating to an occurrence order of the events, and
wherein the control unit displays a data plot group of each measurement result of quality control information on the display unit, and when information of the occurrence of the events of measurement of the quality control information is selected, a data plot corresponding to the information of the occurrence of the events of measurement of the quality control information among the data plot group is highlighted.

11. An automatic analyzer comprising:
an analysis unit that performs an analysis process for analyzing a specimen to be analyzed;
a storage unit that stores information of occurrences of each of events of registration of reagent information which is information on a reagent used for analysis of the specimen, registration of a calibration result for the reagent, and measurement of quality control information using the calibration result, for each analysis item;
a display unit that displays the information of occurrences of the events; and
a control unit, configured to:
control an operation of the analysis process of the specimen by the analysis unit,
read the information of the occurrence of the events from the storage unit and display the read information on the display unit in chronological order,
simultaneously display, on the display unit:
the information of the occurrence of the events, on a plane in which an axis relating to an occurrence time of the events and an axis relating to an occurrence order of the events indicating an order of occurrence of the events are set to be orthogonal to each other, on the display unit, wherein the information of the occurrence of the events of registration of the reagent information, for a plurality of reagents of the same analysis item, are displayed on the plane, according to the occurrence order of the events along the axis relating to an occurrence order of the event and according to the occurrence time of the events along the axis relating to the occurrence time of the events, and graphical information of a line connecting related events, which indicates a connection of the related events, wherein the related events are among the events simultaneously displayed on the plane.

12. The automatic analyzer according to claim 11, wherein the control unit is configured to:

display the information of the occurrence of the events of registration of the reagent information, the information of the occurrence of the events of registration of the calibration result, and the information of the occurrence of the events of measurement of the quality control information so as to be identifiable for one reagent, on the plane, along the axis relating to an occurrence order of the events.

13. The automatic analyzer according to claim 12, wherein the control unit is further configured to filter information to be displayed on the display unit for each of events of registration of the reagent information, registration of the calibration result, and measurement of the quality control information, and wherein the control unit places information on occurrence of an event corresponding to the filtered information on the plane, for a plurality of reagents of the same analysis item.

* * * * *